United States Patent [19]

Binish

[11] Patent Number: 5,720,509

[45] Date of Patent: Feb. 24, 1998

[54] INTEGRAL MOLDED VISOR AND VEHICLE ACCESSORY

[76] Inventor: Patrick W. Binish, 44 Algonquin, Holland, Mich. 49424

[21] Appl. No.: 501,639

[22] Filed: Jul. 12, 1995

[51] Int. Cl.[6] .................................................. B60J 3/00
[52] U.S. Cl. ............................................................. 296/97.5
[58] Field of Search ................................ 296/97.1, 97.5

[56] References Cited

U.S. PATENT DOCUMENTS

| D. 57,653 | 4/1921 | Holsberg | 296/97.1 |
|---|---|---|---|
| 2,034,849 | 3/1936 | Westrope | 296/97.1 |
| 3,751,106 | 8/1973 | Mahler et al. | |
| 4,247,850 | 1/1981 | Marcus | 296/97.5 |
| 4,364,597 | 12/1982 | Viertel et al. | |
| 4,378,129 | 3/1983 | Kaiser et al. | |
| 4,576,409 | 3/1986 | Ebert | |
| 4,610,477 | 9/1986 | Ebert et al. | |
| 4,702,513 | 10/1987 | Ebert et al. | |
| 4,773,699 | 9/1988 | Cebollero | 296/97.1 |
| 5,295,725 | 3/1994 | Jones | |
| 5,390,973 | 2/1995 | Melotti | 296/97.5 |

FOREIGN PATENT DOCUMENTS

| 1430197 | 8/1969 | Germany | 296/97.5 |
|---|---|---|---|
| 2619844 | 11/1977 | Germany | 296/97.5 |
| 258812 | 11/1987 | Japan | 296/97.5 |

*Primary Examiner*—Gary C. Hoge
*Attorney, Agent, or Firm*—Price, Heneveld, Cooper, DeWitt & Litton

[57] ABSTRACT

A visor molded to define a lip which surrounds a vehicle accessory for holding it in place after the molding process. The vehicle accessory may be a vanity mirror, a garage door opener transmitter or other accessory. In a preferred embodiment of the invention, the visor body is formed with a curved cross section along its minor axis to conform the visor shape to that of a curved headliner of a vehicle. The invention includes a method of manufacturing a visor by placing an accessory in a mold for a visor, shaping the mold to define a rim surrounding a portion of the accessory for holding it in place; molding the visor core to hold the accessory in place; and, in a preferred embodiment, placing an upholstery material in the mold such that the visor construction is completed upon completion of the molding process.

14 Claims, 1 Drawing Sheet

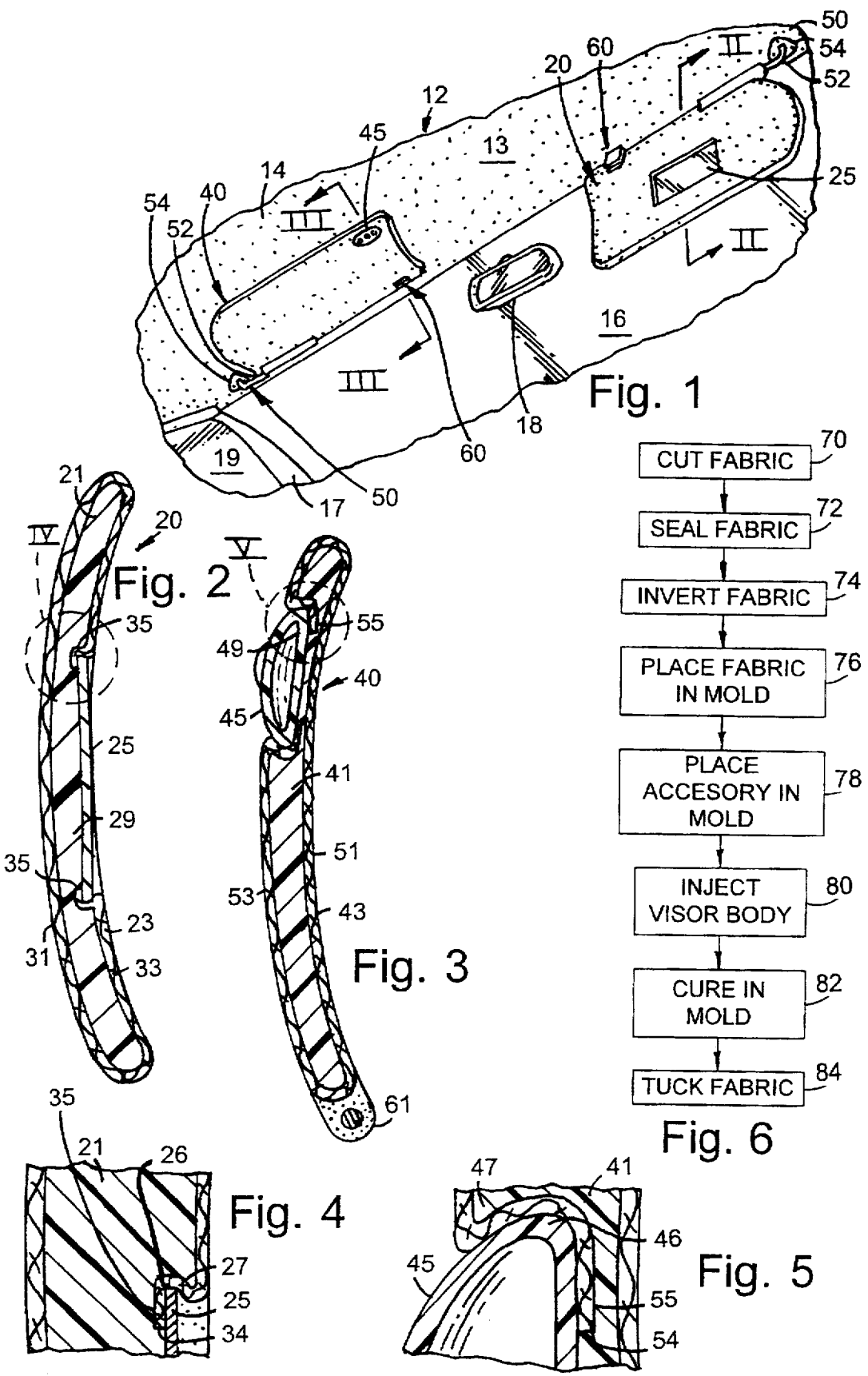

INTEGRAL MOLDED VISOR AND VEHICLE ACCESSORY

BACKGROUND OF THE INVENTION

The present invention relates to visors and particularly to a molded visor for integrally mounting a vehicle accessory thereto.

Visors provide a convenient location for a number of vehicle accessories, notably vanity mirrors which may be illuminated for use under low ambient light conditions, telephones, garage door opening transmitters, storage pockets and the like. In the past, visors have been molded utilizing either a clam-shell core construction which is covered by a fabric material or, as disclosed in U.S. Pat. No. 5,295,725, integrally molded with an outer covering. Accessories which are attached to visors typically are mounted within a recess formed in the visor core as, for example, disclosed in the above '725 patent utilizing snap-in fasteners, adhesives or conventional fastening screws. Although such mounting methods for such vehicle accessories provide adequate mounting of the accessory within the visor, it requires additional fasteners and manufacturing steps to accomplish.

SUMMARY OF THE PRESENT INVENTION

The visor of the present invention overcomes the difficulties of the prior art by providing a visor in which the vehicle accessory is placed in the mold for the visor together with the visor covering. The combination is reaction injection molded or otherwise molded to define a lip which surrounds a vehicle accessory for holding it in place after the molding process. Thus, a vehicle accessory, such as a vanity mirror, garage door opener transmitter or other accessory, can be positioned within a mold and the visor body material molded to form the supporting structure for holding the accessory within the visor body. In a preferred embodiment of the invention, the visor body is formed with a curved cross section along its minor axis to conform the visor shape to that of a curved headliner of a vehicle.

This invention also contemplates a method of manufacturing a visor by placing an accessory in a mold for a visor, shaping the mold to define a rim surrounding a portion of the accessory for holding it in place; molding the visor core to hold the accessory in place; and, in a preferred embodiment, placing an upholstery material in the mold such that the visor construction is completed upon completion of the molding process. Although the invention is particularly applicable to a vehicle visor, other vehicle components likewise could be manufactured to integrally include such accessories by utilizing such a process.

These and other features, objects and advantages of the present invention will become apparent upon reading the following description thereof together with reference to the accompanying drawings.

BRIEF DESCRIPTION OF THE DRAWINGS

FIG. 1 is a fragmentary perspective view of a vehicle embodying the present invention;

FIG. 2 is an enlarged cross-sectional view of one of the visors shown in FIG. 1 taken along section lines II—II of FIG. 1;

FIG. 3 is an enlarged cross-sectional view of the remaining visor shown in FIG. 1 taken along section lines III—III of FIG. 1;

FIG. 4 is a greatly enlarged fragmentary cross-sectional view taken in the encircled area IV of FIG. 2;

FIG. 5 is a greatly enlarged fragmentary cross-sectional view taken in the encircled area V in FIG. 3; and FIG. 6 is a flow diagram in block form of the process for manufacturing a visor according to the present invention.

DETAILED DESCRIPTION OF THE PREFERRED EMBODIMENTS

Referring initially to FIG. 1, there is shown a vehicle 10, such as an automobile, which includes a roof 12 having a headliner 14 which can be preformed and molded with a surface upholstery 13 to conform the headliner to the interior decor of the vehicle. Headliner 14 is mounted above the windshield 16 to which there is mounted a rearview mirror assembly 18. Support pillars such as A-pillar 17 support the roof 12 above the windshield 16 and side window 19 in a conventional manner. The roof 12 includes underlying support structure for receiving a variety of vehicle accessories including visor assemblies 20 and 40, shown in FIG. 1. The driver's side visor assembly 40 is shown in a raised, stored position, and the passenger visor assembly 20 being shown in a lowered, use position for blocking sun light. Each of the visor assemblies 20, 40 include a pivot rod mounting assembly 50 for securing the visor to the vehicle roof 12 utilizing an L-shaped pivot rod 52 around which the visor can pivot between a raised, stored position shown for assembly 20 and a lowered, use position shown for assembly 20. The pivot rod assembly 50 also includes an elbow bracket 54 into which the end of pivot rod 52 pivotally extends for allowing each of the visor assemblies 20, 40 to also pivot to a side window position by releasing the visor from an auxiliary support clip 60 at an end remote from the pivot rod mount 54.

Each of the visor assemblies 20, 40 are shown in greater detail in FIGS. 2 and 3, respectively, and include a body 21, 41, respectively, which is integrally molded of a suitable polymeric material such as reaction injection molded polyurethane. The visor bodies and covering can be injection molded generally according to a process disclosed in U.S. Pat. No. 5,295,725 issued Mar. 22, 1994, entitled VISOR AND METHOD OF MANUFACTURING, which is assigned to the present assignee, the disclosure of which is incorporated by reference. The process of including accessories, such as a vanity mirror 25 in visor assembly 20 or a programmable garage door opening transmitter 45 in visor assembly 40, and the visor shape itself is, however, unique. Each of the visor bodies 21, 41 have a generally curved cross section when viewed along their minor axis as seen in FIGS. 2 and 3 to allow the visors to more closely conform to the front area of the headliner 14 thereby nesting closely adjacent the headliner in modern vehicles which have relatively restricted space in this area.

The polymeric material utilized for cores 21 and 41 can be any suitable material which can be reaction injection molded utilizing an injection machine which injects in the preferred embodiment, for example, an expandable two-part foam material comprising isocyanate and polyol. Other polymeric materials such as two-part expandable foams or epoxies may also be used or a moisture curing urethane could be employed. The material must, however, have sufficient rigidity to define a visor body which does not require additional reinforcing wires or the like and which, as best seen in FIGS. 4 and 5, can be molded around the accessories, such as vanity mirror 25 and garage door opener 45, to define peripheral lips 27, 47 which extend over the peripheral edges 26, 46, respectively of the vehicle accessory, as best seen in FIGS. 2–5. The integral lips 27, 47 hold the accessory in place when the visor core is molded around the accessory which is previously positioned in the mold. Also, a torque fitting is positioned in the mold and receives the end of pivot rod 52 internal to the visor body where it is securely held in place upon molding of the visor body to selectively allow the visor to be lowered and adjusted to a use position, such as shown by visor assembly 20 in FIG. 1. In addition, the mold will include an auxiliary visor rod 61 (FIG. 3) for each of the visors which snap-fits within the auxiliary holding clip 60 mounted to the vehicle roof for securing the visors to the front windshield position.

Each of the visor assemblies 20, 40 also include a suitable fabric covering such as upholstery material 23 and 43, respectively, which, as described below in connection with FIG. 6, is placed in the mold prior to the molding process. The trainable garage door opening transmitter 45 can be of the type disclosed in allowed U.S. patent application Ser. No. 08/209,947, filed Mar. 11, 1994, and entitled TRAINABLE RF TRANSMITTER INCLUDING ATTENUATION CONTROL.

Turning now to FIG. 6, there is shown a flow diagram for the molding process to provide the curved, cross-sectional shape for the visors which include accessories such as mirror 25 or garage door opening transmitter 45. The initial step is illustrated by block 70 in which the fabric material 23 or 43 is cut in two panels defining the front and rear surfaces 31, 33 of visor 20 and 51, 53 of visor assembly 40. Panel 33 includes a generally rectangular opening defining flaps 35 which, as seen in FIGS. 2 and 4, tuck around the lip 27 of visor body 21 and behind mirror 25. Thus, the rectangular opening 34 cut in panel 33 of the visor covering is somewhat smaller than the dimensions of mirror 25. Similarly, a rectangular aperture 54 is cut in surface 53 of fabric 43 of visor assembly 40 to define a flap 55 which extends around and behind the garage door opening transmitter 45 as best seen in FIG. 5.

Next, the two panels 31, 33 and 51, 53 of the visor assemblies 20, 40, respectively, are placed together in inverted relationship and sealed around their periphery, as indicated by step 72 to define a sock-like envelope structure which is subsequently inverted and placed into the mold as indicated by steps 74, 76. Each of the molds will have a first curved surface generally conforming to that of the smoothly curved surfaces 31, 51 of the visor assemblies and an opposite surface similarly curved to define the cross-sectional shape and length of the visor assemblies 20, 40. The opposite surface of the mold will include a suitable holding fixture which may include a vacuum holding member for holding either the vanity mirror 25 in position or the garage door opening transmitter 45 in the relative position to the face surfaces 43, 53, respectively, of the visor assemblies for alignment with the apertures formed in the fabric. The accessory is then placed on the holding fixture, as indicated by block 78, together with the end of the pivot rod assembly 50 which includes a torque fitting which will extend between the fabric panels forming the sock in an end which is available for the injection molding of the polymeric material.

Polymeric material is then injected into the mold cavity within the space between fabric panels and behind the accessories and fills the space around the peripheral edge as defined by the shape of the mold which is the reverse geometry of the cores shown in FIGS. 2–5, respectively, such that the polymeric material forming the cores surround the peripheral edges of the accessory defining a holding lip 27 or 47 as seen in FIGS. 4 and 5, respectively, for holding the accessories to the molded body of the visor so formed. The injection step is indicated by block 80 in FIG. 6 and is followed by the curing of the polymeric material indicated by block 82 whereupon the visor is removed from the mold and the fabric in the areas surrounding the pivot rod into which the molding material is injected is tucked to complete the visor assembly as indicated by block 84.

Thus, with the manufacturing method of the present invention and the resultant construction of a vehicle component such as a visor, the vehicle component integrally holds an accessory such as a mirror, garage door opening transmitter or the like in place without the need for separate fasteners. As can be appreciated, in the case of a vanity mirror assembly or with the garage door opening transmitter, suitable electrical conductors will extend through the inner space of the mold and out typically through a hollow visor pivot rod 52. The injection will take place through a port immediately adjacent the pivot rod. If no electrical conductors are required, however, the injection into the mold can be through a hollow pivot rod itself. In some embodiments of the invention, the mold may be textured to define the decorative outer surface of the vehicle component instead of utilizing fabric as in the preferred embodiment. In such alternate visor constructions, the fabric forming and placing steps can be eliminated.

These and other modifications to the preferred embodiment of the invention as described herein can be made by those skilled in the art that without departing from the spirit or scope of the invention as defined by the appended claims.

The embodiments of the invention in which an exclusive property or privilege is claimed are defined as follows:

1. A vehicle component integrally including an accessory comprising:
   a component body molded of a rigid polymeric material; and
   a vehicle accessory mounted within said body of said component only by a lip integrally formed of said rigid polymeric material forming said component body, said lip molded around and extending over at least opposite edges of said accessory to provide the sole mounting support of said accessory within said body.

2. The component as defined in claim 1 wherein said lip comprises a peripheral lip extending around the periphery of said accessory.

3. The component as defined in claim 2 wherein said component is a vehicle visor.

4. The component as defined in claim 3 wherein said accessory is a vanity mirror.

5. A vehicle component integrally including an accessory comprising:
   a component body molded of a polymeric material; and
   a vehicle accessory integrally held within said body of said component by a peripheral lip integrally formed in said component body to extend around the periphery of said accessory, and wherein said accessory is a programmable garage door opening transmitter.

6. A vehicle visor comprising:
   an elongated visor body molded of a rigid polymeric material and having a curved cross section along its minor axis;
   a mounting bracket for mounting said visor body to a vehicle; and
   a programmable garage door opening transmitter held within said body by a peripheral lip integrally formed in said body and extending over an edge of said programmable transmitter.

7. The visor as defined in claim 6 wherein said visor body includes opposite surfaces wherein one of said surfaces is concave and an opposite surface is convex and is substantially parallel to and spaced from said concave surface.

8. The visor as defined in claim 7 wherein said visor body is molded of a polymeric material.

9. The visor as defined in claim 8 wherein said visor body includes a mirror.

10. A vehicle visor comprising:

an elongated visor body molded of a rigid polymeric material and having a curved cross section along its minor axis;

means for mounting said visor body to a vehicle; and a vehicle accessory mounted within said body of said visor only by a lip integrally formed of said rigid polymeric material forming said visor body, said lip molded around and extending over an edge of said accessory to provide the sole mounting support of said accessory within said visor body.

11. The visor as defined in claim 10 wherein said accessory is a vanity mirror.

12. The visor as defined in claim 10 and further including an upholstery covering overlying said visor body.

13. The visor as defined in claim 10 wherein said visor body includes opposite surfaces wherein one of said surfaces is concave and an opposite surface is convex and is substantially parallel to and spaced from said concave surface.

14. A vehicle visor comprising:

an elongated visor body having a curved cross section along its minor axis;

means for mounting said visor body to a vehicle; and a vehicle accessory integrally held within said body of said visor by a lip integrally formed in said visor body to extend over an edge of said accessory, wherein said accessory is a programmable garage door opening transmitter.

* * * * *

UNITED STATES PATENT AND TRADEMARK OFFICE
CERTIFICATE OF CORRECTION

PATENT NO. : 5,720,509
DATED : February 24, 1998
INVENTOR(S) : Patrick W. Binish It is certified that error appears in the above-indentified patent and that said Letters Patent is hereby corrected as shown below:

Column 2, line 26;
   "20" should be --40--.

Signed and Sealed this

Fourth Day of August, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,720,509

DATED : February 24, 1998

INVENTOR(S) : Patrick W. Binish

It is certified that error appears in the above-identified patent and that said Letters Patent is hereby corrected as shown below:

On the title page, insert item [73] assignee to read as follows
--Prince Corporation, Holland, Mich.--.

Signed and Sealed this

Third Day of November, 1998

Attest:

BRUCE LEHMAN

Attesting Officer

Commissioner of Patents and Trademarks